US012649282B2

(12) United States Patent
Yamazaki

(10) Patent No.: US 12,649,282 B2
(45) Date of Patent: Jun. 9, 2026

(54) METHOD FOR MANUFACTURING THREE-DIMENSIONAL SHAPED OBJECT AND INFORMATION PROCESSING DEVICE

(71) Applicant: Seiko Epson Corporation, Tokyo (JP)

(72) Inventor: Satoshi Yamazaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/659,701

(22) Filed: Apr. 19, 2022

(65) Prior Publication Data

US 2022/0339880 A1 Oct. 27, 2022

(30) Foreign Application Priority Data

Apr. 22, 2021 (JP) ................................. 2021-072225

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
CPC ... B29C 64/118; B29C 64/386; B29C 64/393; B33Y 50/00; B33Y 50/02
See application file for complete search history.

(56) References Cited

U.S. PATENT DOCUMENTS 11,077,619 B2 8/2021 Yuwaki et al.
11,472,121 B2 10/2022 Yuwaki et al.
(Continued)

FOREIGN PATENT DOCUMENTS

CN 108367497 8/2018
CN 108582792 A * 9/2018 ........... B29C 64/118
(Continued)

OTHER PUBLICATIONS

Haisen Zhao, et. al.. Connected fermat spirals for layered fabrication. ACM Trans. Graph. 35, 4, Article 100 (Jul. 2016) (accessed Dec. 12, 2023), 10 pages. https://doi.org/10.1145/2897824.2925958 (Year: 2016).*

(Continued)

*Primary Examiner* — Andrew L Swanson
(74) *Attorney, Agent, or Firm* — WORKMAN NYDEGGER

(57) ABSTRACT
A method for manufacturing a three-dimensional shaped object includes a first step of receiving a selection of a shaping mode for the three-dimensional shaped object, a second step of generating, based on the received shaping mode, shaping data for shaping the three-dimensional shaped object, and a third step of shaping the three-dimensional shaped object based on the shaping data, in which the third step includes a step of controlling a discharge adjusting unit configured to adjust a discharge amount of a shaping material from a nozzle, and the number of times the discharge adjusting unit is controlled in the third step is different depending on the shaping mode received in the first step.

11 Claims, 7 Drawing Sheets

(51) Int. Cl.

| | | |
|---|---|---|
| *B29C 64/209* | (2017.01) |
| *B33Y 10/00* | (2015.01) |
| *B33Y 30/00* | (2015.01) |
| *B33Y 50/02* | (2015.01) |
| *B29C 64/386* | (2017.01) |

(52) U.S. Cl.
CPC .............. *B33Y 10/00* (2014.12); *B33Y 30/00* (2014.12); *B33Y 50/02* (2014.12); *B29C 64/386* (2017.08)

(56) References Cited

U.S. PATENT DOCUMENTS

| | | | |
|---|---|---|---|
| 11,850,801 B2 | 12/2023 | Yuwaki et al. | |
| 2007/0179657 A1* | 8/2007 | Holzwarth | B29C 64/106 |
| | | | 700/187 |
| 2011/0070394 A1* | 3/2011 | Hopkins | B29C 64/112 |
| | | | 428/80 |
| 2014/0048969 A1* | 2/2014 | Swanson | B29C 64/209 |
| | | | 264/129 |
| 2017/0151714 A1* | 6/2017 | Mcgee | B29C 64/118 |
| 2017/0203515 A1* | 7/2017 | Bennett | B29C 64/393 |
| 2017/0210116 A1 | 7/2017 | Shirakawa | |
| 2018/0243984 A1* | 8/2018 | Hayashida | B33Y 50/02 |
| 2018/0326669 A1* | 11/2018 | Chen | B22F 10/28 |
| 2019/0061243 A1* | 2/2019 | Saito | B29B 7/407 |
| 2020/0122407 A1 | 4/2020 | Yamazaki | |
| 2020/0164589 A1 | 5/2020 | Yuwaki et al. | |
| 2021/0178701 A1 | 6/2021 | Yuwak et al. | |
| 2022/0347935 A1 | 11/2022 | Yuwaki et al. | |

FOREIGN PATENT DOCUMENTS

| | | |
|---|---|---|
| CN | 111231306 | 6/2020 |
| JP | 2017-134547 | 8/2017 |
| JP | 2019-025759 | 2/2019 |
| JP | 2019-081263 | 5/2019 |
| WO | 2017123681 A | 7/2017 |

OTHER PUBLICATIONS

Machine Translation of Ma (CN108582792A), Sep. 28, 2018 (generated Sep. 27, 2024), Espacenet (Year: 2018).*

* cited by examiner

FIG. 5

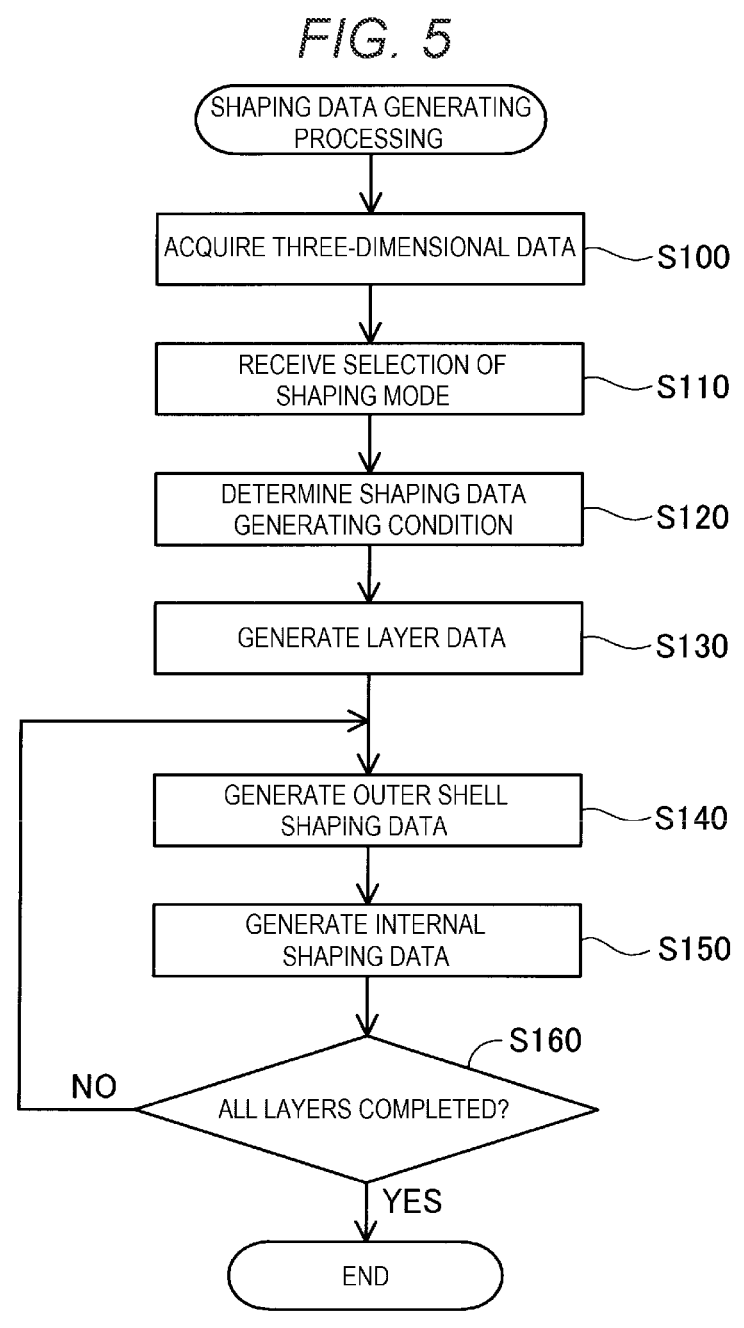

```
     ┌─────────────────────────────┐
     │  SHAPING DATA GENERATING    │
     │       PROCESSING            │
     └─────────────────────────────┘
                  │
                  ▼
     ┌─────────────────────────────┐
     │ ACQUIRE THREE-DIMENSIONAL DATA│───── S100
     └─────────────────────────────┘
                  │
                  ▼
     ┌─────────────────────────────┐
     │    RECEIVE SELECTION OF      │───── S110
     │      SHAPING MODE           │
     └─────────────────────────────┘
                  │
                  ▼
     ┌─────────────────────────────┐
     │  DETERMINE SHAPING DATA      │───── S120
     │  GENERATING CONDITION       │
     └─────────────────────────────┘
                  │
                  ▼
     ┌─────────────────────────────┐
     │    GENERATE LAYER DATA       │───── S130
     └─────────────────────────────┘
                  │
                  ▼
     ┌─────────────────────────────┐
     │    GENERATE OUTER SHELL      │───── S140
     │     SHAPING DATA            │
     └─────────────────────────────┘
                  │
                  ▼
     ┌─────────────────────────────┐
     │    GENERATE INTERNAL         │───── S150
     │     SHAPING DATA            │
     └─────────────────────────────┘
                  │
                  ▼
        ◇──────────────────────── S160
   NO   ALL LAYERS COMPLETED?
        ◇
           │ YES
           ▼
     ┌──────────────┐
     │     END      │
     └──────────────┘
```

FIG. 6

| MODE NAME | HIGH-DEFINITION MODE | INTENSITY PRIORITY MODE | STANDARD MODE | LIGHTWEIGT MODE | SPEED PRIORITY MODE |
|---|---|---|---|---|---|
| INTENSITY | HIGH | HIGH | STANDARD | LOW | LOW |
| SHAPING TIME | LONG | SHORT | STANDARD | LONG | SHORT |
| SHAPING DATA GENERATING CONDITION | | | | | |
| LINE WIDTH | THIN | THICK | STANDARD | THIN | THICK |
| DEPOSITION PITCH | NARROW | WIDE | STANDARD | NARROW | WIDE |
| INTERNAL FILLING RATE | HIGH | LOW | STANDARD | HIGH | LOW |
| FILLING PATTERN | COMPLICATED | COMPLICATED | STANDARD | SIMPLE | SIMPLE |
| MOVING SPEED OF DISCHARGE UNIT | SLOW | QUICK | STANDARD | SLOW | QUICK |
| NUMBER OF DISCHARGE CONTROL | LARGE | SMALL | STANDARD | LARGE | SMALL |
| SHAPING CHARACTERISTIC | | | | | |
| SHAPING ACCURACY | HIGH | LOW | STANDARD | HIGH | LOW |
| DIMENSIONAL ACCURACY | HIGH | LOW | STANDARD | HIGH | LOW |
| SURFACE ROUGHNESS | FINE | ROUGH | STANDARD | FINE | ROUGH |
| MATERIAL USAGE AMOUNT | LARGE | LARGE | STANDARD | SMALL | SMALL |

THREE-DIMENSIONAL
SHAPING PROCESSING

ACQUIRE SHAPING DATA — S200

READ SHAPING DATA OF ONE LAYER — S210

FIRST SHAPING PROCESSING — S220

SECOND SHAPING PROCESSING — S230

S240
SHAPING COMPLETED FOR
ALL LAYERS?

NO

YES

END

STOP

CA

METHOD FOR MANUFACTURING THREE-DIMENSIONAL SHAPED OBJECT AND INFORMATION PROCESSING DEVICE

The present application is based on, and claims priority from JP Application Serial Number 2021-072225, filed Apr. 22, 2021, the disclosure of which is hereby incorporated by reference herein in its entirety.

BACKGROUND

1. Technical Field

The present disclosure relates to a method for manufacturing a three-dimensional shaped object and an information processing device.

2. Related Art

Regarding a method for manufacturing a three-dimensional shaped object, for example, JP-A-2019-81263 discloses that a flow rate adjusting mechanism including a butterfly valve is controlled to control the start and stop of discharge of a molten material and a discharge amount.

In the related art, in order to shape a shaped object with desired characteristics such as intensity and accuracy, a user adjusts control data for controlling each unit of a three-dimensional shaping device such as the flow rate adjusting mechanism described above, and repeats a trial production. Thus, there is a demand for a technique capable of shaping a three-dimensional shaped object having desired characteristics by a simple method.

SUMMARY

A first aspect of the present disclosure provides a method for manufacturing a three-dimensional shaped object. The method for manufacturing a three-dimensional shaped object includes a first step of receiving a selection of a shaping mode for the three-dimensional shaped object, a second step of generating, based on the received shaping mode, shaping data for shaping the three-dimensional shaped object, and a third step of shaping the three-dimensional shaped object based on the shaping data, in which the third step includes a step of controlling a discharge adjusting unit configured to adjust a discharge amount of a shaping material from a nozzle, and the number of times the discharge adjusting unit is controlled in the third step is different depending on the shaping mode received in the first step.

A second aspect of the present disclosure provides an information processing device. The information processing device includes a reception unit configured to receive a selection of a shaping mode for a three-dimensional shaped object, a shaping data generating unit configured to generate shaping data for shaping the three-dimensional shaped object based on the received shaping mode, and a transmission unit configured to transmit the shaping data to a three-dimensional shaping device, in which the three-dimensional shaping device includes a discharge adjusting unit configured to adjust a discharge amount of a shaping material from a nozzle and controls the discharge adjusting unit based on the shaping data, and the shaping data generating unit generates the shaping data such that the number of times the discharge adjusting unit is controlled in the three-dimensional shaping device is different depending on the shaping mode received by the reception unit.

BRIEF DESCRIPTION OF THE DRAWINGS

FIG. 5 is a flowchart of shaping data generating processing.

FIG. 6 is a diagram showing examples of shaping modes.

DESCRIPTION OF EXEMPLARY EMBODIMENTS

A. First Embodiment

Figure 1:
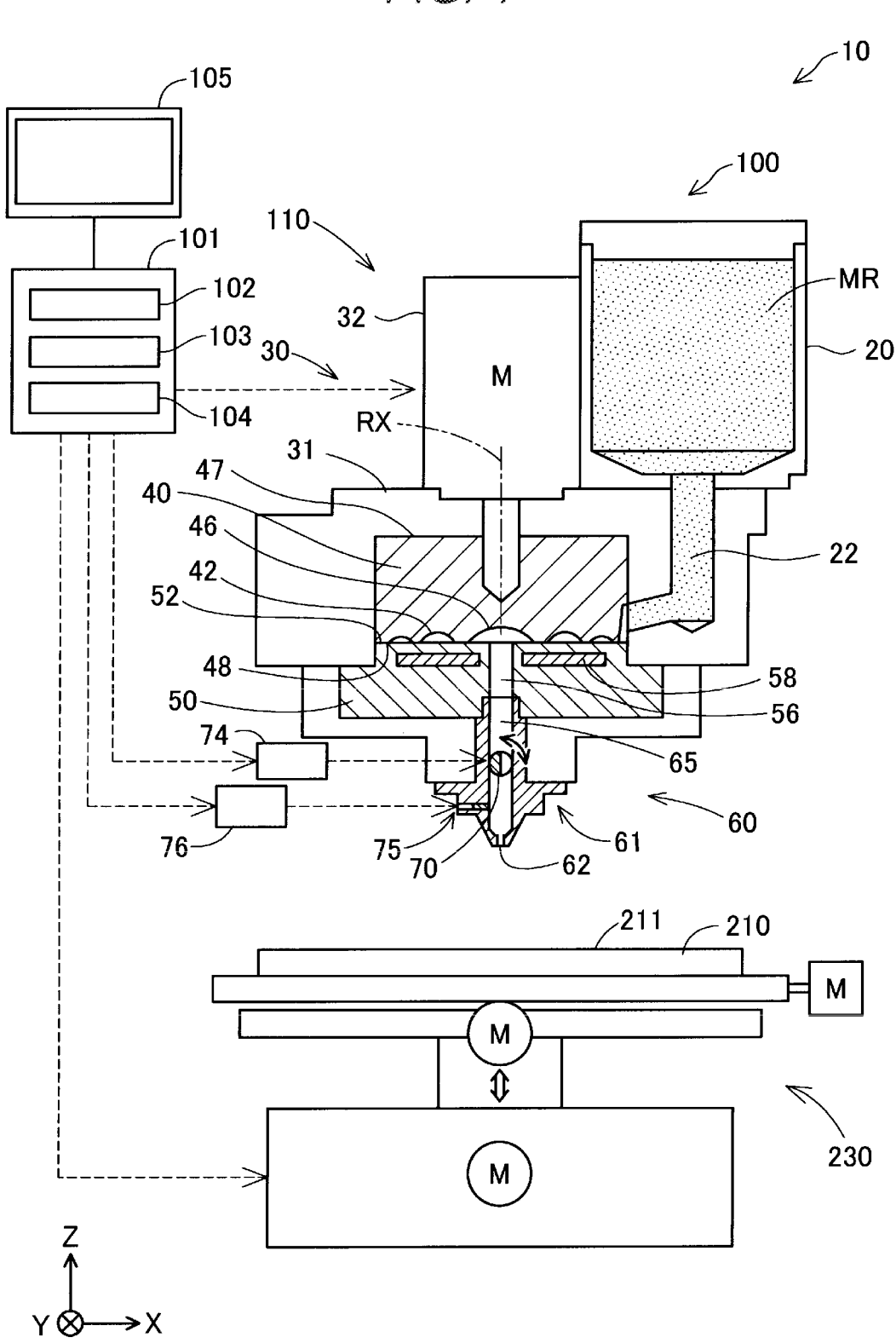
FIG. 1 is a diagram illustrating a schematic configuration of a three-dimensional shaping system.

FIG. 1 is a diagram illustrating a schematic configuration of a three-dimensional shaping system 10 according to a first embodiment. FIG. 1 shows arrows indicating X, Y, and Z directions orthogonal to one another. The X direction and the Y direction are directions parallel to a horizontal plane, and the Z direction is a direction along a vertically upward direction. The arrows indicating the X, Y, and Z directions are appropriately shown in other drawings such that the shown directions correspond to those in FIG. 1. In the following description, when a direction is specified, a direction indicated by an arrow in each drawing is referred to as "+", a direction opposite thereto is referred to as "−", and a positive or negative sign is used in combination with a direction notation. Hereinafter, the +Z direction is also referred to as "upper", and the −Z direction is also referred to as "lower".

The three-dimensional shaping system 10 includes a three-dimensional shaping device 100 and a control unit 101 that controls the three-dimensional shaping device 100. The three-dimensional shaping device 100 includes a shaping unit 110 that generates and discharges a shaping material, a shaping stage 210 as a base of a three-dimensional shaped object, and a moving mechanism 230 that controls a discharge position of the shaping material. The three-dimensional shaping device 100 may be accommodated in a chamber (not shown).

Under the control of the control unit 101, the shaping unit 110 melts a material in a solid state and discharges the shaping material in a form of a paste onto the stage 210. The shaping unit 110 includes a material supply unit 20 as a supply source of the material before being converted into the shaping material, a shaping material generating unit 30 that converts the material into the shaping material, and a discharge unit 60 that discharges the shaping material.

The material supply unit 20 supplies a raw material MR for generating the shaping material to the shaping material generating unit 30. The material supply unit 20 is constituted by, for example, a hopper in which the raw material MR is accommodated. The material supply unit 20 has a discharge port on a lower side. The discharge port is coupled to the shaping material generating unit 30 via a communication path 22. The raw material MR is charged into the material supply unit 20 in a form of pellets, powders, and the like. In the present embodiment, a pellet-shaped ABS resin material is used.

The shaping material generating unit 30 melts the raw material MR supplied from the material supply unit 20 to generate a paste-like shaping material exhibiting fluidity, and guides the shaping material to the discharge unit 60. The shaping material generating unit 30 includes a screw case 31, a drive motor 32, a flat screw 40, and a screw facing portion 50. The flat screw 40 is also referred to as a rotor or a scroll, and the screw facing portion 50 is also referred to as a barrel.

Figure 2:
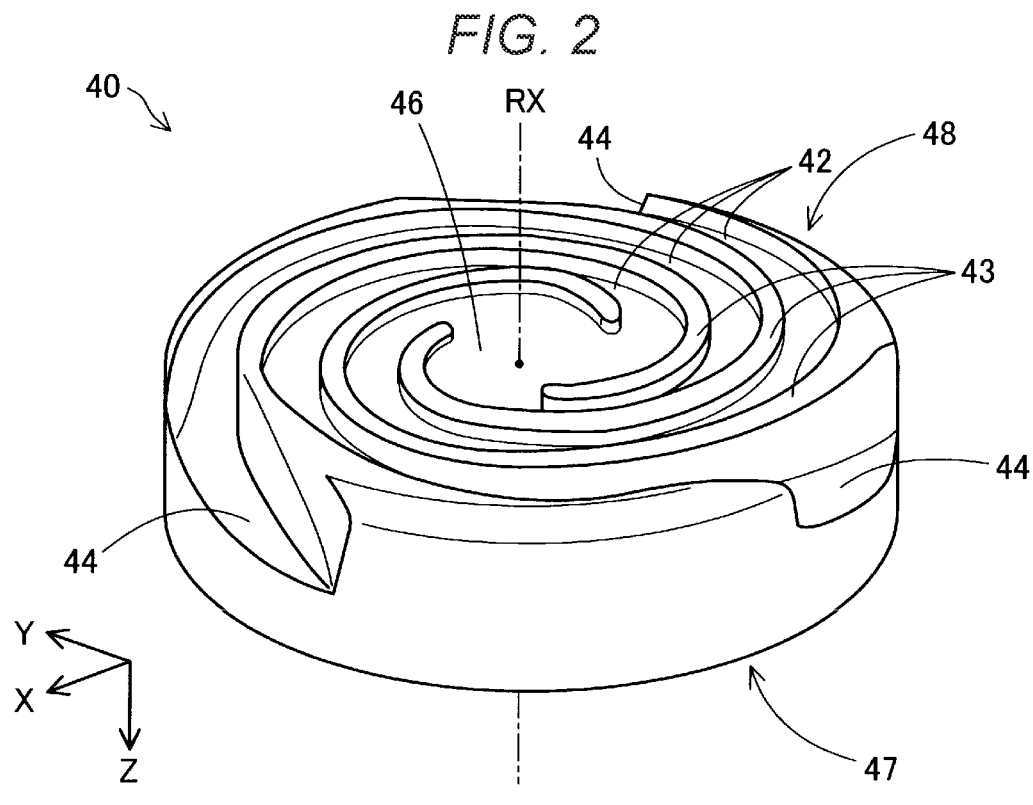
FIG. 2 is a perspective view showing a schematic configuration of a flat screw.
Figure 3:
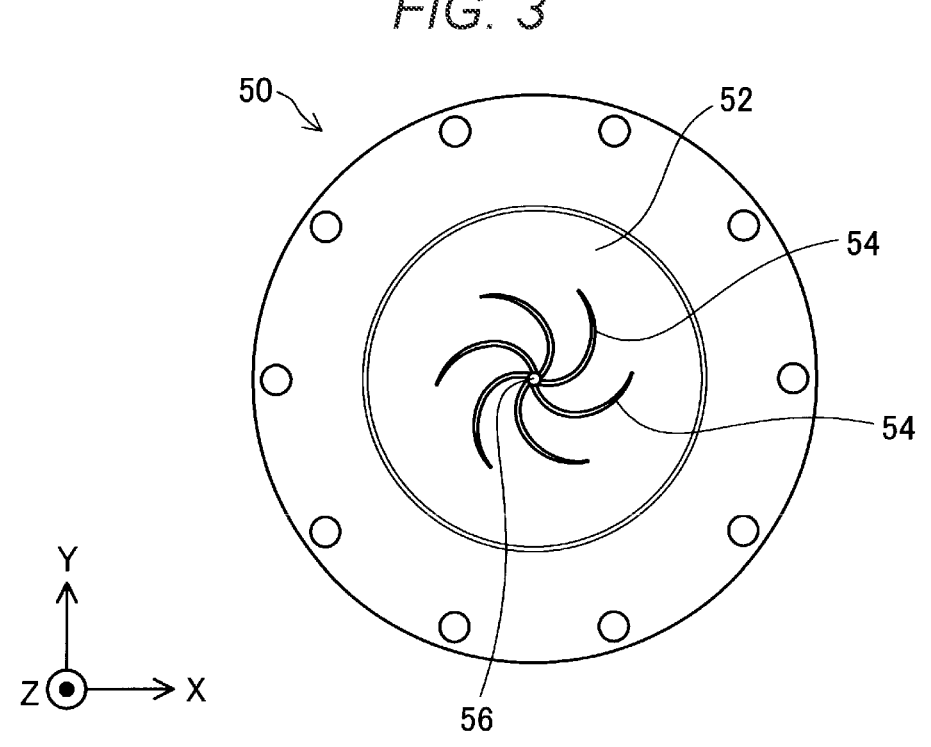
FIG. 3 is a schematic plan view of a screw facing portion.

FIG. 2 is a perspective view showing a schematic configuration of a lower surface 48 side of the flat screw 40. In order to facilitate understanding of the technique, the flat screw 40 shown in FIG. 2 is shown in a state where a positional relation between an upper surface 47 and the lower surface 48 shown in FIG. 1 is reversed in a vertical direction. FIG. 3 is a schematic plan view showing an upper surface 52 side of the screw facing portion 50. The flat screw 40 has a substantially cylindrical shape in which a height in an axial direction, which is a direction along a central axis of the flat screw 40, is smaller than a diameter of the flat screw 40. The flat screw 40 is disposed such that a rotation axis RX serving as a rotation center of the flat screw 40 is parallel to the Z direction.

The flat screw 40 is accommodated in the screw case 31. The upper surface 47 side of the flat screw 40 is coupled to the drive motor 32, and the flat screw 40 is rotated in the screw case 31 by a rotational drive force generated by the drive motor 32. The drive motor 32 is driven under the control of the control unit 101. The flat screw 40 may be driven by the drive motor 32 via a speed reducer.

Spiral groove portions 42 are formed in the lower surface 48 of the flat screw 40 which is a surface intersecting the rotation axis RX. The communication path of the material supply unit 20 described above communicates with the groove portions 42 from a side surface of the flat screw 40. As shown in FIG. 2, in the present embodiment, three groove portions 42 are formed so as to be separated from each other by ridge portions 43. The number of the groove portions 42 is not limited to three, and may be one or two or more. A shape of the groove portions 42 is not limited to a spiral shape, and may be a helical shape or an involute curve shape, or may be a shape extending so as to draw an arc from a central portion toward an outer periphery.

The lower surface 48 of the flat screw 40 faces the upper surface 52 of the screw facing portion 50, and a space is formed between the groove portion 42 of the lower surface 48 of the flat screw 40 and the upper surface 52 of the screw facing portion 50. In the shaping unit 110, the raw material MR is supplied from the material supply unit 20 to material inlets 44 shown in FIG. 2 in the space between the flat screw 40 and the screw facing portion 50.

A heater 58 for heating the raw material MR supplied into the groove portions 42 of the rotating flat screw 40 is embedded in the screw facing portion 50. A plurality of guide grooves 54 coupled to the communication hole 56 and extending in a spiral shape from the communication hole 56 toward the outer periphery are formed in the screw facing portion 50. One end of the guide groove 54 may not be coupled to the communication hole 56. The guide grooves 54 may be omitted.

The raw material MR supplied into the groove portions 42 of the flat screw 40 flows along the groove portions 42 by the rotation of the flat screw 40 while being melted in the groove portions 42, and is guided as the shaping material to a central portion 46 of the flat screw 40. The paste-like shaping material that flows into the central portion 46 and exhibits fluidity is supplied to the discharge unit 60 via the communication hole 56 provided at a center of the screw facing portion 50 shown in FIG. 3. In the shaping material, not all types of substances constituting the shaping material may be melted. The shaping material may be converted into a state having fluidity as a whole by melting at least a part of types of the substances constituting the shaping material.

The discharge unit 60 includes a nozzle 61 that discharges the shaping material, a flow path 65 for the shaping material provided between the flat screw 40 and a nozzle opening 62, a discharge adjusting unit 70 that opens and closes the flow path 65, and a suction unit 75 that suctions and temporarily stores the shaping material. The nozzle 61 is coupled to the communication hole 56 of the screw facing portion 50 through the flow path 65. The nozzle 61 discharges the shaping material generated by the shaping material generating unit 30 from the nozzle opening 62 at a tip toward the stage 210. A heater that prevents a decrease in temperature of the shaping material discharged onto the stage 210 may be disposed around the nozzle 61.

The discharge adjusting unit 70 is provided in the flow path 65 communicating with the nozzle opening 62, and changes an opening degree of the flow path 65 by rotating in the flow path 65. In the present embodiment, the discharge adjusting unit 70 is constituted by a butterfly valve. The discharge adjusting unit 70 is driven by a first driving unit 74 under the control of the control unit 101. The first driving unit 74 is constituted by, for example, a stepping motor. The control unit 101 can adjust a flow rate of the shaping material flowing from the shaping material generating unit 30 to the nozzle 61, that is, a discharge amount of the shaping material discharged from the nozzle 61, by controlling a rotation angle of the butterfly valve using the first driving unit 74. The discharge adjusting unit 70 adjusts the discharge amount of the shaping material and controls ON or OFF of an outflow of the shaping material.

The suction unit 75 is coupled between the discharge adjusting unit 70 and the nozzle opening 62 in the flow path 65. The suction unit 75 temporarily suctions the shaping material in the flow path 65 when the discharge of the shaping material from the nozzle 61 is stopped, thereby preventing an elongating phenomenon in which the shaping material drips like pulling a thread from the nozzle opening 62. In the present embodiment, the suction unit 75 is constituted by a plunger. The suction unit 75 is driven by a second driving unit 76 under the control of the control unit 101. The second driving unit 76 is constituted by, for example, a stepping motor, or a rack-and-pinion mechanism that converts a rotational force of the stepping motor into a translational motion of a plunger.

The stage 210 is disposed at a position facing the nozzle opening 62 of the nozzle 61. In the first embodiment, a shaping surface 211 of the stage 210 facing the nozzle opening 62 of the nozzle 61 is disposed so as to be parallel to the X and Y directions, that is, the horizontal direction. In three-dimensional shaping processing described later, the three-dimensional shaping device 100 shapes a three-dimensional shaped object by discharging the shaping material from the discharge unit toward the shaping surface 211 of the stage 210 and depositing layers. The stage 210 may be provided with a heater for preventing rapid cooling of the shaping material discharged onto the stage 210.

The moving mechanism 230 changes a relative position between the stage 210 and the nozzle 61. In the first embodiment, the position of the nozzle 61 is fixed, and the moving mechanism 230 moves the stage 210. The moving mechanism 230 is implemented by a three-axis positioner that moves the stage 210 in three-axis directions of the X, Y, and Z directions by drive forces of three motors. The moving mechanism 230 changes a relative positional relation between the nozzle 61 and the stage 210 under the control of the control unit 101. In the present specification, unless otherwise specified, a movement of the nozzle 61 means that the nozzle 61 or the discharge unit 60 is moved relatively to the stage 210.

In another embodiment, instead of the configuration in which the stage 210 is moved by the moving mechanism 230, a configuration in which the moving mechanism 230 moves the nozzle 61 with respect to the stage 210 in a state where the position of the stage 210 is fixed may be adopted. Further, a configuration in which the stage 210 is moved in the Z direction and the nozzle 61 is moved in the X and Y directions by the moving mechanism 230, or a configuration in which the stage 210 is moved in the X and Y directions and the nozzle 61 is moved in the Z direction by the moving mechanism 230 may be adopted. With these configurations, the relative positional relation between the nozzle 61 and the stage 210 can be changed.

The control unit 101 is a control device that controls an overall operation of the three-dimensional shaping device 100. The control unit 101 is constituted by a computer including one or a plurality of processors, a storage device, and an input and output interface for inputting and outputting signals to and from an outside. A display unit 105 constituted by a liquid crystal display, an organic EL display, or the like is coupled to the control unit 101. The control unit 101 causes a reception unit 102, a shaping data generating unit 103, and a shaping processing unit 104 to function by the processor executing a program or instruction read on the storage device. Instead of being constituted by the computer, the control unit 101 may be implemented by a configuration of combining a plurality of circuits in order to implement at least a part of the functions. The control unit 101 is also referred to as an information processing device.

The reception unit 102 receives a selection of a shaping mode for the three-dimensional shaped object from a user through an input device such as a mouse or keyboard (not shown). The shaping mode includes at least one of a mode related to intensity of the three-dimensional shaped object and a mode related to a shaping time of the three-dimensional shaped object. Details of the shaping mode will be described below.

The shaping data generating unit 103 generates, based on the shaping mode received by the reception unit 102, shaping data for shaping the three-dimensional shaped object. The shaping data includes path information indicating a movement path of the discharge unit 60, discharge amount information indicating a discharge amount of the shaping material in each movement path, and control information for controlling the discharge adjusting unit and the suction unit 75. The movement path of the discharge unit 60 refers to a path along which the nozzle 61 moves along the shaping surface 211 of the stage 210 while discharging the shaping material.

The path information includes a plurality of partial paths. Each of the partial paths is a linear path represented by a start point and an end point. The discharge amount information is individually associated with each partial path. In the present embodiment, the discharge amount represented by the discharge amount information is an amount of the shaping material discharged per unit time in the partial path. In another embodiment, a total amount of the shaping material discharged in all partial paths may be associated with each partial path as the discharge amount information.

The shaping processing unit 104 controls the shaping unit 110 including the discharge adjusting unit 70 and the discharge unit 60 and the moving mechanism 230 based on the shaping data generated by the shaping data generating unit 103 to shape the three-dimensional shaped object on the stage 210. The shaping processing unit 104 causes the discharge unit 60 to move while discharging the shaping material based on the path information and the discharge amount information included in the shaping data at the time of shaping the three-dimensional shaped object, and controls the discharge adjusting unit 70 and the suction unit 75 based on the control information.

Figure 4:
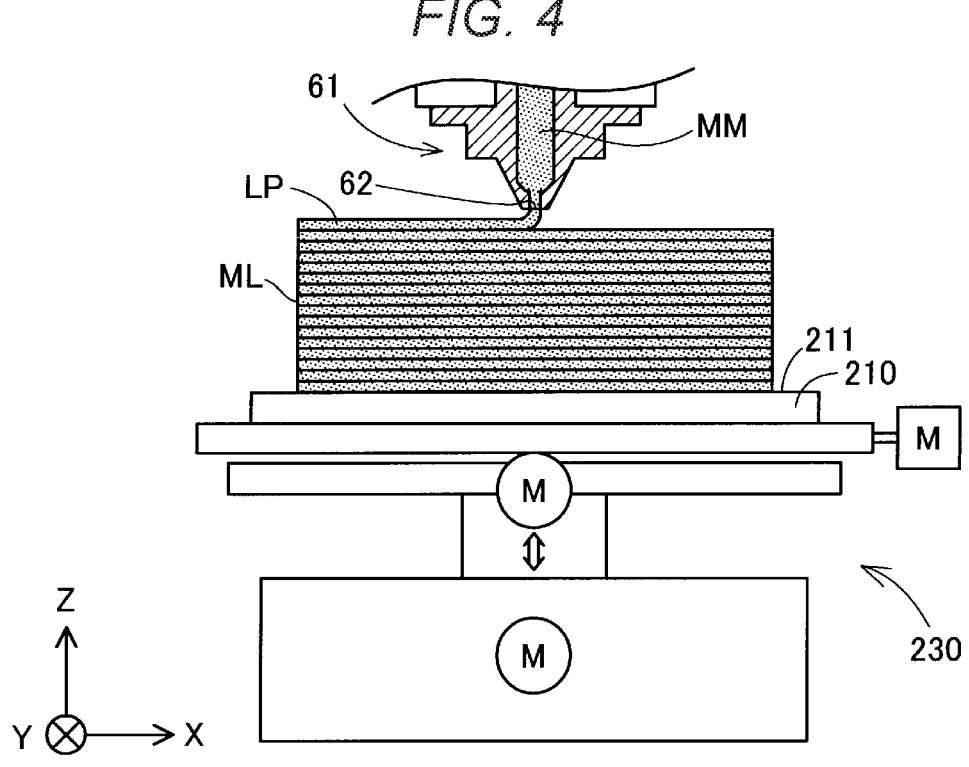
FIG. 4 is a diagram schematically illustrating a state where a three-dimensional shaped object is being shaped.

FIG. 4 is a diagram schematically illustrating a state where a three-dimensional shaped object is being shaped in the three-dimensional shaping device 100. In the three-dimensional shaping device 100, as described above, the solid raw material MR supplied to the groove portions 42 of the rotating flat screw 40 is melted to generate a shaping material MM in the shaping material generating unit 30. The control unit 101 causes the nozzle 61 to discharge the shaping material MM while changing the position of the nozzle 61 with respect to the stage 210 in a direction along the shaping surface 211 of the stage 210 with a distance maintained constant between the shaping surface 211 of the stage 210 and the nozzle 61. The shaping material MM discharged from the nozzle 61 is continuously deposited in a moving direction of the nozzle 61. By traversal with the nozzle 61, a linear portion LP that is a shaping portion linearly extending along a traversal path of the nozzle 61 is shaped.

The control unit 101 forms a layer ML by repeating the traversal with the nozzle 61. The control unit 101 moves the position of the nozzle 61 with respect to the stage 210 in the Z direction after one layer ML is formed. Then, a layer ML is further deposited on the layers ML formed so as to shape a three-dimensional shaped object.

For example, the control unit 101 may temporarily interrupt the discharge of the shaping material from the nozzle 61 when the nozzle 61 moves in the Z direction after one layer ML is completed or when there are a plurality of independent shaping regions in each layer. In this case, the flow path 65 is closed by the discharge adjusting unit 70 to stop the discharge of the shaping material MM from the nozzle opening 62, and the shaping material in the nozzle 61 is temporarily suctioned by the suction unit 75. After changing the position of the nozzle 61, the control unit 101 discharges the shaping material in the suction unit 75 while opening the flow path 65 by the discharge adjusting unit 70, whereby deposition of the shaping material MM from a changed position of the nozzle 61 is resumed.

FIG. 5 is a flowchart of shaping data generating processing executed by the control unit 101. The shaping data generating processing is processing for generating the shaping data to be used for shaping the three-dimensional shaped object prior to the shaping of the three-dimensional shaped object.

As shown in FIG. 5, in step S100, the control unit 101 acquires three-dimensional data representing the shape of the three-dimensional shaped object. The control unit 101 acquires, for example, three-dimensional data such as three-dimensional CAD data from the outside through a network or a recording medium.

In step S110, the reception unit 102 receives a selection of the shaping mode from a user. For example, the control unit 101 displays names of shaping modes on the display unit 105, and the user selects a desired shaping mode using the input device such as a mouse or a keyboard. Step S110 is also referred to as a first step in the method for manufacturing a three-dimensional shaped object.

FIG. 6 is a diagram showing examples of the shaping modes. In the present embodiment, as the mode related to the intensity of the three-dimensional shaped object or the mode related to the shaping time of the three-dimensional shaped object, (1) a high-definition mode, (2) an intensity priority mode, (3) a standard mode, (4) a lightweight mode, and (5) a speed priority mode are prepared. In these modes, the intensity of the three-dimensional shaped object and the shaping time until the three-dimensional shaped object is completed are different. In the example shown in FIG. 6, in the high-definition mode, the intensity is higher than that in the standard mode, and the shaping time is longer than that in the standard mode. In the intensity priority mode, the intensity is higher than that in the standard mode and the shaping time is shorter than that in the standard mode. In the lightweight mode, the intensity is lower than that in the standard mode and the shaping time is longer than that in the standard mode. In the speed priority mode, the intensity is lower than that in the standard mode and the shaping time is shorter than that in the standard mode. A mode that includes either a mode for shaping the three-dimensional shaped object with high intensity or a mode for shaping the three-dimensional shaped object in a long time is called a non-standard mode.

In step S120 of FIG. 5, the shaping data generating unit 103 determines a shaping data generating condition based on the shaping mode received in step S110. As shown in FIG. 6, various shaping data generating conditions are set and stored in the storage device of the control unit 101 in order to realize the intensity and the shaping time corresponding to each of the shaping modes. The shaping data generating unit 103 determines the shaping data generating conditions based on the shaping mode with reference to the storage device of the control unit 101. The shaping data generating condition includes a line width, a deposition pitch, an internal filling rate, a filling pattern, a moving speed of the discharge unit 60, and the number of discharge control. For example, in the high-definition mode, compared with the standard mode, the following are set as the shaping data generating conditions: (1) narrowing the line width; (2) narrowing the deposition pitch; (3) increasing the filling rate; (4) complicating the filling pattern; and (5) slowing down the moving speed of the discharge unit 60. By generating the shaping data according to these shaping data generating conditions, shaping characteristics such as shaping accuracy, dimensional accuracy, a surface roughness, and a material usage amount are achieved in addition to the intensity and the shaping time. In FIG. 6, for ease of understanding, the shaping data generating conditions are shown by comparison with the standard mode, but specified values of each condition such as the line width and the deposition pitch are specified. The shaping data generating conditions and shaping characteristics shown in FIG. 6 are merely examples, other conditions and characteristics may be defined, and some of the conditions and characteristics shown in FIG. 6 may be omitted.

Figure 7:
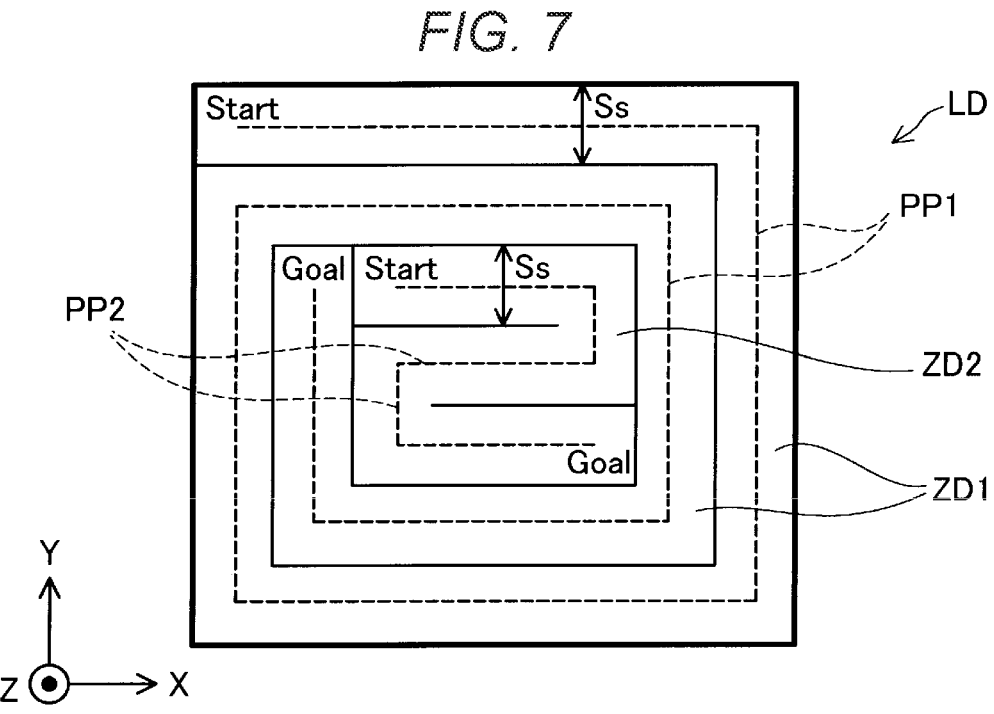
FIG. 7 is a diagram showing an example of layer data.

The description returns to FIG. 5. In step S130, the shaping data generating unit 103 analyzes the three-dimensional data acquired in step S100, and generates layer data acquired by slicing the three-dimensional shaped object into a plurality of layers along the XY plane. A slicing interval is set based on the deposition pitch in the shaping data generating conditions determined in step S120. The layer data is data representing an outer shell of the three-dimensional shaped object in the XY plane. FIG. 7 is a diagram showing an example of layer data LD. In FIG. 7, a portion corresponding to the outer shell represented by the layer data LD is indicated by a thick line.

In step S140 of FIG. 5, the shaping data generating unit 103 generates outer shell shaping data according to the shaping data generating conditions determined in step S120. The outer shell shaping data is data for forming an outer shell region in contact with an inner side of the outer shell represented by the layer data LD. The outer shell region is a region influencing an appearance of the three-dimensional shaped object. The outer shell shaping data includes a path for shaping an outermost periphery along the outer shell of the three-dimensional shaped object. The outer shell shaping data may include not only path information for shaping the outermost periphery of the three-dimensional shaped object but also path information including one inner periphery of the outermost periphery. The number of periphery of the path information for forming the outer shell region may be freely set.

FIG. 7 shows the example in which outer shell shaping data ZD1 includes outermost path information and path information for one inner periphery thereof. Each of these pieces of path information includes a plurality of partial paths PP1 for shaping the outer shell region. As described above, the partial paths PP1 are linear paths. Each of the partial paths PP1 is associated with a discharge amount of the shaping material deposited on the stage 210 having a line width Ss specified in the shaping data generating conditions, i.e., the discharge amount information. The line width is determined based on an opening degree of the butterfly valve provided in the discharge adjusting unit 70. Therefore, for example, in the high-definition mode in which the intensity of the three-dimensional shaped object to be shaped is high and the shaping time is long, the line width is set narrow, and thus, when shaping the three-dimensional shaped object, a maximum opening degree of the butterfly valve is smaller than that in the case where the standard mode is selected.

In step S150 of FIG. 5, the shaping data generating unit 103 generates internal shaping data according to the shaping data generating conditions determined in step S120. The internal shaping data is data for shaping an internal region that is a region inside the outer shell represented by the layer data LD and is a region other than the outer shell region in the three-dimensional shaped object. The internal region is a region that has a larger influence on intensity of the three-dimensional shaped object than on the appearance of the three-dimensional shaped object.

FIG. 7 shows the example in which internal shaping data ZD2 is represented inside the outer shell shaping data ZD1. In FIG. 7, the path information for filling the internal region represented by the internal shaping data ZD2 is formed in a manner of meandering by a plurality of partial paths PP2. As described above, the partial paths PP2 are linear paths. The path information representing the internal shaping data ZD2 is determined by the internal filling rate and the filling pattern specified in the shaping data generating conditions. A lower internal filling rate makes a distance between adjacent paths wider, resulting in paths with wider gaps. A more complicated filling pattern makes paths with more angles in the movement path, that is, paths with a large number of partial paths. As the filling pattern, for example, there are types such as grid, triangle, concentric circle, and honeycomb, and a pattern satisfying complexities in the shaping data generating conditions is specified for each of the shaping data generating conditions. Each of the partial paths PP2 included in the internal shaping data ZD is associated with the discharge amount having a line width specified in the shaping data generating conditions, i.e., the discharge amount information.

Hereinafter, the outer shell shaping data generated in step S140 and the internal shaping data generated in step S150 are collectively referred to as "shaping data". The shaping data includes path data representing, by the plurality of partial paths, a path along which the discharge unit 60 moves while discharging the shaping material, and discharge amount data including discharge amount information representing the discharge amount of the shaping material in each of the partial paths.

In the present embodiment, the shaping data further includes the moving speed of the discharge unit 60, and discharge control information for controlling the discharge of the shaping material by the discharge adjusting unit 70 and the suction unit 75. The moving speed is specified by the shaping data generating conditions determined in step S120. The discharge control information is information for controlling ON or OFF of discharging the shaping material at the start point and the end point of the partial path. The number of times the discharge of the shaping material is turned ON or OFF is hereinafter referred to as "the number of discharge control" or simply "the number of control". The degree of the number of discharge control is defined based on the shaping data generating conditions. For example, in the high-definition mode in which the intensity of the three-dimensional shaped object to be shaped is high and the shaping time is long, the discharge control information is set such that the number of discharge control is larger than that in the standard mode.

Figure 8:
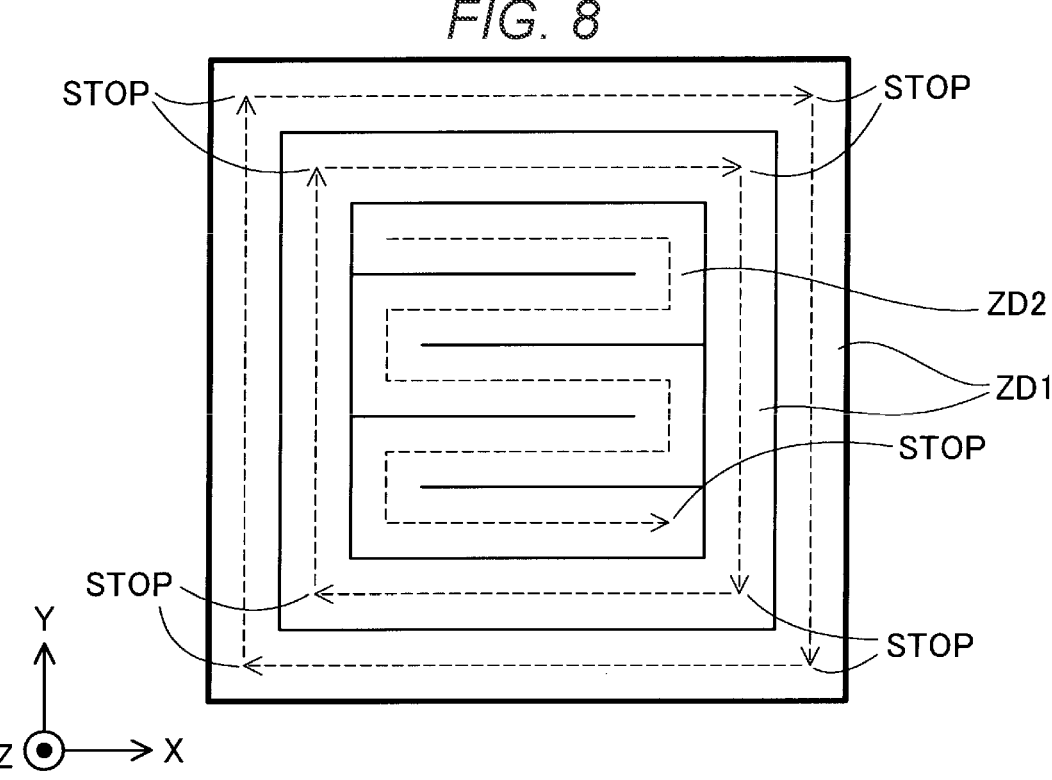
FIG. 8 is a diagram illustrating the number of discharge control.

FIG. 8 is a diagram illustrating the number of discharge control. FIG. 8 shows an example in which the number of discharge control is large in the movement path constituting the outer shell shaping data ZD1 and the number of discharge control is small in the movement path constituting the internal shaping data ZD2. As shown in FIG. 8, in a mode in which the number of discharge control is small, the shaping data generating unit 103 generates a movement path such that the movement path is continuous with a single stroke while the discharge is on. In contrast, in a mode in which the number of discharge control is large, the shaping data generating unit 103 sets the discharge control information such that the discharge of the shaping material is temporarily stopped each time the discharge unit 60 is located at a corner of the movement path, and the discharge of the shaping material is resumed after a predetermined time elapses. In the shaping mode in which the number of discharge control is large, the number of discharge control may be increased only in the outer shell shaping data ZD1, or the number of discharge control may be increased in both the outer shell shaping data ZD1 and the internal shaping data ZD2.

The shaping data generating unit 103 realizes the temporary stop of the discharge by describing control commands to the discharge adjusting unit 70 and the suction unit 75 such that the following control is performed on the shaping data. The control is a series of control including: firstly, temporarily stopping the movement of the discharge unit 60; setting the discharge amount of the shaping material to zero by the discharge adjusting unit 70; suctioning the shaping material from the nozzle opening 62 by the suction unit 75; after a lapse of a predetermined period, increasing the opening degree of the discharge adjusting unit 70 while discharging the shaping material from the suction unit 75; starting discharging the shaping material; and resuming the movement of the discharge unit 60.

In step S160 of FIG. 5, the shaping data generating unit 103 determines whether the above processing is completed on all layer data. When the processing is not completed on all layer data, the shaping data generating unit 103 repeats the processing from step S140 and step S150 on next layer data. When the generation of the shaping data is completed for all the layer data, the shaping data generating unit 103 ends the shaping data generating processing. Steps S130 to S160 are also referred to as a second step in the method for manufacturing a three-dimensional shaped object.

Figures 9, 10:
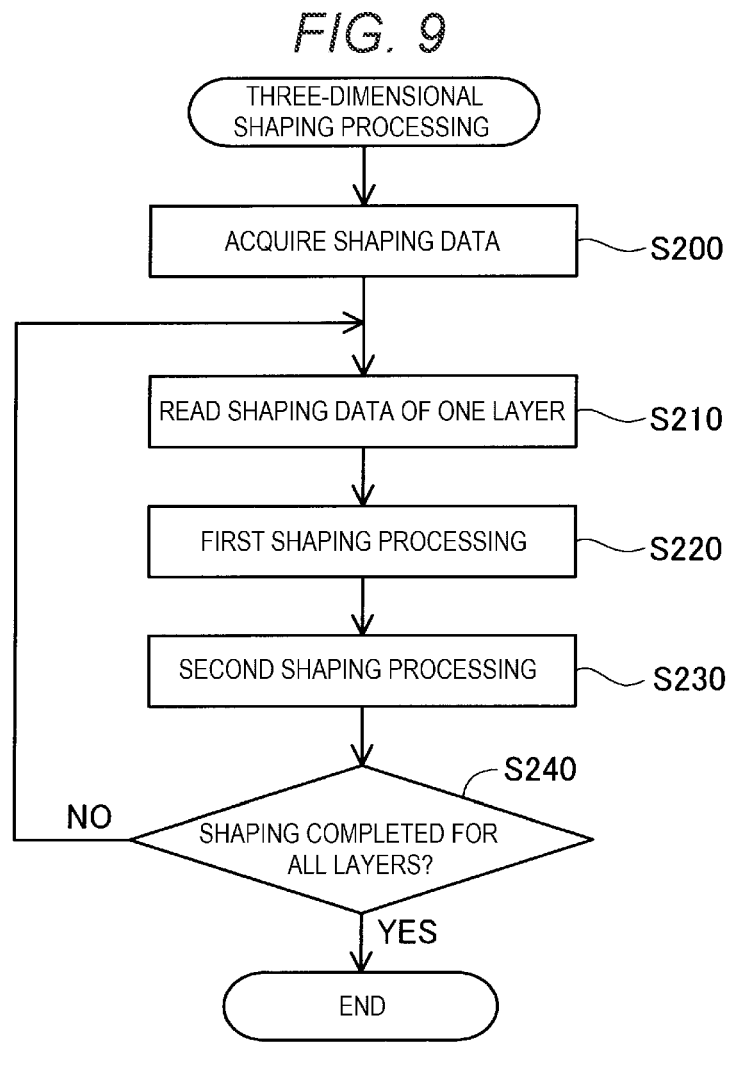
FIG. 9 is a flowchart of three-dimensional shaping processing.
FIG. 10 is a diagram showing a coupling angle between two partial paths.

FIG. 9 is a flowchart of the three-dimensional shaping processing executed by the control unit 101. The three-dimensional shaping processing is processing executed by the control unit 101 using the shaping data generated in the shaping data generating processing shown in FIG. 5. By executing the shaping data generating processing shown in FIG. 5 and the three-dimensional shaping processing shown in FIG. 9, the method for manufacturing a three-dimensional shaped object by the three-dimensional shaping device 100 is implemented. The three-dimensional shaping processing is also referred to as a third step in the method for manufacturing a three-dimensional shaped object.

In step S200, the control unit 101 acquires the shaping data generated by the shaping data generating processing described above. Then, in step S210, the control unit 101 reads the shaping data for one layer among a plurality of layers constituting the three-dimensional shaped object. In the present embodiment, first, the control unit 101 reads shaping data of a lowermost layer among the plurality of layers constituting the three-dimensional shaped object.

In step S220, the control unit 101 executes first shaping processing. In the first shaping processing, the control unit 101 controls the moving mechanism 230, the discharge adjusting unit 70, and the suction unit 75 according to the partial paths, the discharge amount information, and the discharge control information included in the outer shell shaping data to form the outer shell region for a current layer.

In step S230, the control unit 101 executes second shaping processing. In the second shaping processing, the control unit 101 controls the moving mechanism 230, the discharge adjusting unit 70, and the suction unit 75 according to the partial paths, the discharge amount information, and the discharge control information included in the internal shaping data to form the internal region for the current layer.

In step S240, the control unit 101 determines whether the shaping is completed for all layers. When the shaping has not been completed for all layers, the control unit 101 returns the processing to step S210, and executes the processing of steps S210 to S230 for a next layer, that is, the layer adjacent to the upper side of the current layer. In this case, in step S220, prior to the discharge of the shaping material from the discharge unit 60, the control unit 101 controls the moving mechanism 230 to raise the position of the nozzle 61 by one layer.

In step S240, when it is determined that the shaping is completed for all layers, the control unit 101 ends the three-dimensional shaping processing. The three-dimensional shaped object manufactured in this way is shaped according to the shaping data generating conditions corresponding to the shaping mode specified by the user at the time of shaping data generating. Thus, with the three-dimensional shaping processing, the intensity, the shaping time, and the number of discharge control based on the shaping mode are implemented, and the shaping characteristics such as the shaping accuracy, the dimensional accuracy, the surface roughness, and the material usage amount shown in FIG. 6 are implemented. For example, when the shaped object is shaped based on the shaping data generated in the high-definition mode, compared with the case where the shaped object is shaped in the standard mode, at least a part of the following is performed by the three-dimensional shaping processing: (1) narrowing the line width; (2) narrowing the deposition pitch; (3) increasing the filling rate; (4) complicating the filling pattern, that is, increasing the number of partial paths included in the movement path; (5) slowing down the moving speed of the discharge unit 60; and (6) increasing the material usage amount.

According to the first embodiment described above, the number of times the discharge adjusting unit 70 is controlled can be made different depending on the shaping mode selected at the time of generating the shaping data. Thus, the user does not have to finely adjust the control data and repeat the trial production, and a three-dimensional shaped object having characteristics based on the shaping mode can be shaped by simply selecting the shaping mode. For example, in the shaping mode in which the number of discharge control is large, the shaped object can be shaped with high intensity, and in the mode in which the number of discharge control is small, the shaped object can be shaped in a short time.

According to the present embodiment, the shaping mode includes at least the mode related to the intensity of the three-dimensional shaped object or the mode related to the shaping time of the three-dimensional shaped object, and thus, the user can easily select a desired shaping mode from the modes prepared based on the intensity and the shaping time.

In the present embodiment, like in the high-definition mode, when the mode for shaping a three-dimensional shaped object with high intensity or the mode for shaping a three-dimensional shaped object for a long time is selected, the number of times the discharge adjusting unit 70 is controlled is larger than that in the case where the standard mode is selected. Thus, when these modes are selected, the shaping accuracy can be improved. In particular, by increasing the number of times the discharge adjusting unit 70 is controlled in the outer shell region, the shaping accuracy in the outer shell region can be improved.

In the present embodiment, the discharge adjusting unit 70 is implemented by the butterfly valve, and when the mode for shaping a three-dimensional shaped object with high intensity or the mode for shaping a three-dimensional shaped object for a long time is selected, the maximum opening degree of the butterfly valve is smaller than that in the case where the standard mode is selected. Thus, in the high-definition mode such as the mode for shaping with high intensity or the mode for shaping for a long time, since the flow rate of the shaping material discharged from the discharge unit 60 is reduced, the line width can be reduced or the deposition pitch can be narrowed to perform shaping.

In the present embodiment, like in the high-definition mode, when the mode for shaping a three-dimensional shaped object with high intensity or the mode for shaping a three-dimensional shaped object for a long time is selected, the number of times the suction unit 75 operates is larger than that in the case where the standard mode is selected. Thus, the drip of the shaping material from the nozzle 61 is prevented, and the shaping accuracy can be improved.

B. Other Embodiments (B1) FIG. 10 is a diagram showing a coupling angle CA between two partial paths indicated by arrows. In the above-described embodiment, in a case where the standard mode is selected, the three-dimensional shaping device 100 may control the discharge adjusting unit 70 to temporarily stop the discharge of the shaping material when an angle at which two consecutive partial paths included in the movement path of the discharge unit 60 are coupled is equal to or larger than a first angle. That is, in the case where the standard mode is selected, the shaping data generating unit 103 may control the discharge adjusting unit 70 and generate discharge control information so as to temporarily stop the discharge of the shaping material at a coupling portion when the angle at which two consecutive partial paths included in the movement path of the discharge unit 60 are coupled is equal to or larger than the first angle. In this manner, at the time of the three-dimensional shaping, the discharge can be temporarily stopped based on the coupling angle CA between the partial paths, and the shaping accuracy can be improved. The angle at which the two partial paths are coupled is from 0 degrees, which is the minimum value of the angle when the two partial paths are coupled in series, to 180 degrees, which is the maximum value of the angle when the two partial paths are coupled like being folded.

In this case, like in the high-definition mode, when the mode for shaping a three-dimensional shaped object with high intensity or the mode for shaping a three-dimensional shaped object for a long time is selected, the three-dimensional shaping device 100 may control the discharge adjusting unit 70 to temporarily stop the discharge of the shaping material when the angle CA is smaller than the first angle and is equal to or larger than a second angle. That is, like in the high-definition mode, when the mode for shaping a three-dimensional shaped object with high intensity or the mode for shaping a three-dimensional shaped object for a long time is selected, the shaping data generating unit 103 may generate discharge control information such that the discharge of the shaping material is temporarily stopped at an angle at which the two partial paths are coupled smaller than that in the case where the standard mode is selected. In this manner, at the time of the three-dimensional shaping, since the discharge of the shaping material is temporarily stopped at a smaller angle at which the two partial paths are coupled, the shaping accuracy can be improved.

(B2) The dimensional accuracy, the surface roughness, and the filling rate of the three-dimensional shaped object are greatly related to the shaping time of the three-dimensional shaped object. For example, it takes a long shaping time to improve the dimensional accuracy, and it also takes a long shaping time to make the surface roughness finer. Even if the filling rate is increased, the shaping time is long. Thus, the mode related to the shaping time of the three-dimensional shaped object may be a mode related to at least one of the dimensional accuracy, the surface roughness, and the filling rate. That is, the control unit 101 may receive, as the mode related to the shaping time, a mode related to the dimensional accuracy, a mode related to the surface roughness, and a mode related to the filling rate.

(B3) In the above-described embodiment, the discharge of the shaping material is temporarily stopped by driving both the discharge adjusting unit 70 and the suction unit 75. In contrast, for example, only the discharge adjusting unit 70 or only the suction unit 75 may be operated to temporarily stop the discharge.

(B4) In the above-described embodiment, a material is plasticized by the flat screw 40 in the shaping unit 110. In contrast, the shaping unit 110 may plasticize the material by, for example, rotating an in-line screw. In addition, a head used in a fused deposition modeling method may be adopted as the shaping unit 110.

(B5) In the above-described embodiment, the flow rate of the shaping material is adjusted by using the discharge adjusting unit 70 constituted by the butterfly valve. In contrast, the flow rate of the shaping material may be adjusted by controlling the number of rotations of the flat screw 40.

(B6) In the above-described embodiment, the three-dimensional shaping device 100 is provided with the suction unit 75, but the three-dimensional shaping device 100 may not be provided with the suction unit 75.

(B7) In the above-described embodiment, the control unit 101 executes both the shaping data generating processing and the three-dimensional shaping processing. In contrast, the shaping data generating processing and the three-dimensional shaping processing may be performed by different control units. In this case, for example, the control unit that executes the shaping data generating processing is configured as an information processing device, and the control unit that executes the three-dimensional shaping processing is provided in the three-dimensional shaping device. The information processing device includes a transmission unit that transmits the shaping data to the three-dimensional shaping device.

(B8) In the above-described embodiment, a pellet-shaped ABS resin material is used as a raw material to be supplied to the material supply unit 20. In contrast, the three-dimensional shaping device 100 can shape the three-dimensional shaped object using various materials such as a thermoplastic material, a metal material, and a ceramic material as a main material. Here, the "main material" refers to a material serving as a center component for forming a shape of the three-dimensional shaped object, and refers to a material having a content of 50 mass % or more in the three-dimensional shaped object. The above-described shaping material includes a material acquired by melting the main material alone or a material acquired by melting the main material and a part of components contained in the main material into a paste form.

When the thermoplastic material is used as the main material, the shaping material generating unit 30 generates the shaping material by plasticization of this material. The term "plasticization" refers to that a thermoplastic material is heated and melted.

Examples of the thermoplastic material include the following thermoplastic resin materials.

Examples of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyether imide, and polyether ether ketone Additives such as a wax, a flame retardant, an antioxidant, and a heat stabilizer in addition to a pigment, a metal, and ceramic may be mixed into the thermoplastic material. In the shaping material generating unit 30, the thermoplastic material is converted into a melted state by being plasticized by the rotation of the flat screw 40 and heating of the heater 58. After the shaping material generated by melting the thermoplastic material is discharged from the nozzle 61, the shaping material is cured due to a reduction in temperature.

The thermoplastic material is preferably injected from the nozzle 61 in a state of being heated to a temperature equal to or higher than the glass transition point thereof and completely melted. For example, a glass transition point of the ABS resin is about 120° C., and it is desirable that the ABS resin is discharged from the nozzle 61 at about 200° C.

In the three-dimensional shaping device 100, for example, the following metal materials may be used as the main material instead of the thermoplastic materials described above. In this case, it is desirable that a component to be melted at the time of generating the shaping material is mixed with a powder material acquired by converting the following metal materials into a powder, and then the mixture is charged as a raw material into the shaping material generating unit 30.

Examples of Metal Material

A single metal such as magnesium (Mg), iron (Fe), cobalt (Co), chromium (Cr), aluminum (Al), titanium (Ti), copper (Cu), and nickel (Ni), or an alloy containing one or more of these metals Examples of Alloy Maraging steel, stainless steel, cobalt chromium molybdenum, titanium alloy, nickel alloy, aluminum alloy, cobalt alloy, and cobalt chromium alloy In the three-dimensional shaping device 100, the ceramic material may be used as the main material instead of the metal material described above. Examples of the ceramic material include an oxide ceramic such as silicon dioxide, titanium dioxide, aluminum oxide, and zirconium oxide, and a non-oxide ceramic such as aluminum nitride. When the metal material or the ceramic material described above is used as the main material, the shaping material disposed on the stage 210 may be cured by irradiating with a laser or sintering with hot air.

A powder material of the metal material or the ceramic material to be charged into the material supply unit 20 as the raw material may be a mixed material acquired by mixing a plurality of types of powders of a single metal, powders of an alloy, and powders of the ceramic material. Further, the powder material of the metal material or the ceramic material may be coated with, for example, the thermoplastic resin described above, or a thermoplastic resin other than those described above. In this case, the thermoplastic resin may be melted in the shaping material generating unit 30 to exhibit fluidity.

For example, the following solvents may be added to the powder material of the metal material or the ceramic material to be charged into the material supply unit 20 as the raw material. As the solvent, one kind or a combination of two or more kinds selected from the following can be used.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate In addition, for example, the following binders may be added to the powder material of the metal material or the ceramic material to be charged into the material supply unit 20 as the raw material.

Examples of Binder

Acrylic resin, epoxy resin, silicone resin, cellulose-based resin or other synthetic resins, polylactic acid (PLA), polyamide (PA), polyphenylene sulfide (PPS), polyetheretherketone (PEEK) or other thermoplastic resins

C. Other Aspects

The present disclosure is not limited to the above embodiments, and can be implemented by various configurations without departing from the gist of the present disclosure. For example, in order to solve a part or all of problems described above, or to achieve a part or all of effects described above, technical characteristics in the embodiments corresponding to technical characteristics in aspects to be described below can be replaced or combined as appropriate. The technical features can be deleted as appropriate unless described as essential in the present specification.

(1) A first aspect of the present disclosure provides a method for manufacturing a three-dimensional shaped object. The method for manufacturing a three-dimensional shaped object includes a first step of receiving a selection of a shaping mode for the three-dimensional shaped object, a second step of generating, based on the received shaping mode, shaping data for shaping the three-dimensional shaped object, and a third step of shaping the three-dimensional shaped object based on the shaping data, in which the third step includes a step of controlling a discharge adjusting unit configured to adjust a discharge amount of a shaping material from a nozzle, and the number of times the discharge adjusting unit is controlled in the third step is different depending on the shaping mode received in the first step.

According to such an aspect, the number of times the discharge adjusting unit is controlled can be made different depending on the shaping mode selected at the time of generating the shaping data, and thus, a three-dimensional shaped object having characteristics based on the shaping mode can be shaped by simply selecting the shaping mode.

(2) In the above-described aspect, the shaping mode may include at least one of a mode related to intensity of the three-dimensional shaped object and a mode related to a shaping time of the three-dimensional shaped object. According to such an aspect, the shaping mode can be selected based on the intensity and the shaping time.

(3) In the above-described aspect, the mode related to shaping time of the three-dimensional shaped object may be a mode related to at least one of dimensional accuracy, a surface roughness, and a filling rate.

(4) In the above-described aspect, when a non-standard mode including a mode for shaping a three-dimensional shaped object with high intensity or a mode for shaping a three-dimensional shaped object for a long time is selected, the number of times the discharge adjusting unit is controlled in the third step may be different from that in a case where a standard mode is selected as the shaping mode.

(5) In the above-described aspect, when the non-standard mode is selected, the number of times the discharge adjusting unit is controlled in the third step may be larger than that in the case where the standard mode is selected. According to such an aspect, the shaping accuracy in the mode for shaping the three-dimensional shaped object with high intensity and the mode for shaping the three-dimensional shaped object for a long time can be improved.

(6) In the above-described aspect, when the non-standard mode is selected, the number of times the discharge adjusting unit in the third step is controlled at the time of shaping an outer shell region of the three-dimensional shaped object may be larger than that in the case where the standard mode is selected. According to such an aspect, it is possible to further improve the shaping accuracy in the outer shell region of the three-dimensional shaped object.

(7) In the above-described aspect, when the non-standard mode is selected, compared with the case where the standard mode is selected, one of the following may be performed in shaping the three-dimensional shaped object in the third step: (1) narrowing a line width; (2) narrowing a deposition pitch; (3) increasing a filling rate; (4) increasing the number of partial paths included in a movement path of the nozzle; (5) slowing down a moving speed of the nozzle; and (6) increasing a material usage amount.

(8) In the above-described aspect, the discharge adjusting unit may be a butterfly valve provided in a flow path communicating with a nozzle opening of the nozzle, and when the non-standard mode is selected, a maximum opening degree of the butterfly valve may be smaller than that in the case where the standard mode is selected. According to such an aspect, in the mode for shaping with high intensity or the mode for shaping with long time, since the flow rate of the shaping material discharged from the discharge unit is reduced, the line width or the deposition pitch can be narrowed to perform shaping.

(9) In the above-described aspect, when the non-standard mode is selected, the number of times a suction unit operates may be larger than that in the case where the standard mode is selected as the shaping mode, the suction unit being disposed between the discharge adjusting unit and the nozzle opening of the nozzle and configured to suction the shaping material. According to such an aspect, in a mode for implementing high-intensity or long-time shaping, the drip of the shaping material from the nozzle is prevented, and the shaping accuracy can be improved.

(10) In the above-described aspect, when the standard mode is selected, the discharge adjusting unit may be controlled to temporarily stop discharge of the shaping material when an angle at which two consecutive partial paths included in the movement path of the nozzle are coupled is equal to or larger than a first angle in the third step, and when the non-standard mode is selected, the discharge adjusting unit is controlled to temporarily stop the discharge of the shaping material when the angle is equal to or larger than a second angle which is smaller than the first angle. According to such an aspect, when the mode for shaping the three-dimensional shaped object with high intensity or the mode for shaping the three-dimensional shaped object for a long time is selected, since the number of times the discharge of the shaping material is temporarily stopped at the corners is increased, high-intensity or long-time shaping can be implemented.

(11) A second aspect of the present disclosure provides an information processing device. The information processing device includes a reception unit configured to receive a selection of a shaping mode for a three-dimensional shaped object, a shaping data generating unit configured to generate, based on the received shaping mode, shaping data for shaping the three-dimensional shaped object, and a transmission unit configured to transmit the shaping data to a three-dimensional shaping device, in which the three-dimensional shaping device includes a discharge adjusting unit configured to adjust a discharge amount of a shaping material from a nozzle, and controls the discharge adjusting unit based on the shaping data, and the shaping data generating unit generates the shaping data such that the number of times the discharge adjusting unit is controlled in the three-dimensional shaping device is different depending on the shaping mode received by the reception unit.

What is claimed is:

1. A method for manufacturing a three-dimensional shaped object, comprising:

a first step of receiving a selection of a shaping mode for a three-dimensional shaped object;

a second step of generating, based on the received shaping mode, shaping data for shaping the three-dimensional shaped object, wherein the shaping data includes an inner shell shaping data and an outer shell shaping data, which includes an outermost periphery of the three-dimensional shaped object and one inner periphery of the outermost periphery; and a third step of discharging a shaping material to shape the three-dimensional shaped object based on the shaping data, wherein the inner shell shaping data includes path information, which includes a first plurality of linear partial paths for discharging the shaping material, wherein each linear partial path includes a start point and an end point connected to the start point, the third step includes adjusting a discharge amount of the shaping material from a nozzle, the discharge amount is individually adjusted for each linear partial path, the number of times of adjusting of the discharge amount in the third step is different depending on the shaping mode received in the first step, the outer shell shaping data includes path information, which includes a second plurality of linear partial paths and each linear partial path includes a start position and an end position connected to the start position with one line, the discharge amount of the shaping material from the nozzle is adjusted by starting and temporarily stopping discharging of the shaping material at the start position and the end position of each linear partial path, respectively, and the shaping material is suctioned from a nozzle opening of the nozzle after temporarily stopping discharging of the shaping material.

2. The method for manufacturing a three-dimensional shaped object according to claim 1, wherein the shaping mode includes at least one of a mode related to intensity of the three-dimensional shaped object and a mode related to a shaping time of the three-dimensional shaped object.

3. The method for manufacturing a three-dimensional shaped object according to claim 2, wherein the mode related to the shaping time of the three-dimensional shaped object is a mode related to at least one of dimensional accuracy, a surface roughness, and a filling rate.

4. The method for manufacturing a three-dimensional shaped object according to claim 1, wherein when a non-standard mode including a mode for shaping a three-dimensional shaped object with intensity higher than that in a standard mode or a mode for shaping a three-dimensional shaped object for a time longer than that in the standard mode is selected, the number of times of adjusting of the discharge amount in the third step is different from that in a case where the standard mode is selected as the shaping mode.

5. The method for manufacturing a three-dimensional shaped object according to claim 4, wherein when the non-standard mode is selected, the number of times of adjusting of the discharge amount in the third step is larger than that in the case where the standard mode is selected.

6. The method for manufacturing a three-dimensional shaped object according to claim 5, wherein when the non-standard mode is selected, the number of times of adjusting of the discharge amount in the third step at the time of shaping an outer shell region of the three-dimensional shaped object is larger than that in the case where the standard mode is selected.

7. The method for manufacturing a three-dimensional shaped object according to claim 4, wherein when the non-standard mode is selected, compared with the case where the standard mode is selected, at least one of the following is performed in shaping the three-dimensional shaped object in the third step: (1) narrowing a line width; (2) narrowing a deposition pitch; (3) increasing a filling rate; (4) increasing the number of partial paths included in a movement path of the nozzle; (5) slowing down a moving speed of the nozzle; and (6) increasing a material usage amount.

8. The method for manufacturing a three-dimensional shaped object according to claim 4, wherein the discharge amount is adjusted by a butterfly valve provided in a flow path communicating with a nozzle opening of the nozzle, and when the non-standard mode is selected, a maximum opening degree of the butterfly valve is smaller than that in the case where the standard mode is selected.

9. The method for manufacturing a three-dimensional shaped object according to claim 4, wherein when the non-standard mode is selected, the number of times of suctioning operations is larger than the case where the standard mode is selected as the shaping mode, the suctioning operation being performed between adjusting of the discharge amount and a nozzle opening of the nozzle, and configured to suction the shaping material.

10. The method for manufacturing a three-dimensional shaped object according to claim 4, wherein when the standard mode is selected, the adjusting of the discharge amount temporarily stop discharge of the shaping material when an angle at which two consecutive partial paths included in the movement path of the nozzle are coupled is equal to or larger than a first angle in the third step, and when the non-standard mode is selected, adjusting of the discharge amount is controlled to temporarily stop the discharge of the shaping material when the angle is equal to or larger than a second angle which is smaller than the first angle.

11. The method for manufacturing a three-dimensional shaped object according to claim 1, wherein the number of times of adjusting of the discharge amount in the third step is the number of a series of control including; setting the discharge amount of the shaping material from the nozzle to zero by adjusting an opening degree of a channel through which the shaping material flows, suctioning the shaping material from the nozzle opening of the nozzle, and after a lapse of a predetermined period, increasing the discharge amount by adjusting the opening degree of the channel while discharging the shaping material sucked from the nozzle opening.

* * * * *